United States Patent
Deguillard et al.

(10) Patent No.: US 9,547,510 B2
(45) Date of Patent: Jan. 17, 2017

(54) TRACKING GUEST MEMORY CHARACTERISTICS FOR MEMORY SCHEDULING

(71) Applicant: VMware, Inc., Palo Alto, CA (US)

(72) Inventors: Xavier Deguillard, Sunnyvale, CA (US); Ishan Banerjee, Santa Clara, CA (US); Qasim Ali, Santa Clara, CA (US); Yury Baskakov, Newton, MA (US); Kiran Tati, Santa Clara, CA (US); Rajesh Venkatasubramanian, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 261 days.

(21) Appl. No.: 14/101,787

(22) Filed: Dec. 10, 2013

(65) Prior Publication Data
US 2015/0161055 A1 Jun. 11, 2015

(51) Int. Cl.
*G06F 9/46* (2006.01)
*G06F 9/455* (2006.01)
*G06F 9/50* (2006.01)

(52) U.S. Cl.
CPC ........... *G06F 9/455* (2013.01); *G06F 9/45558* (2013.01); *G06F 9/50* (2013.01); *G06F 9/5016* (2013.01); *G06F 9/5077* (2013.01); G06F 2009/45583 (2013.01); G06F 2212/152 (2013.01)

(58) Field of Classification Search
None
See application file for complete search history.

(56) References Cited

U.S. PATENT DOCUMENTS

| | | |
|---|---|---|
| 6,789,156 B1 | 9/2004 | Waldspurger |
| 7,412,492 B1 | 8/2008 | Waldspurger |
| 8,145,763 B2 | 3/2012 | Waldspurger |
| 8,171,140 B2 | 5/2012 | Waldspurger |

(Continued)

OTHER PUBLICATIONS

Denneman et.al. "Memory reclamation, when and how?" Jun. 11, 2010 (http://frankdenneman.nl/2010/06/11/memory-reclaimation-when-and-how/).*

(Continued)

*Primary Examiner* — Midys Rojas
*Assistant Examiner* — Tasnima Matin
(74) *Attorney, Agent, or Firm* — Patterson & Sheridan LLP

(57) ABSTRACT

A system and method are disclosed for improving operation of a memory scheduler operating on a host machine supporting virtual machines (VMs) in which guest operating systems and guest applications run. For each virtual machine, the host machine hypervisor categorizes memory pages into memory usage classes and estimates the total number of pages for each memory usage class. The memory scheduler uses this information to perform memory reclamation and allocation operations for each virtual machine. The memory scheduler further selects between ballooning reclamation and swapping reclamation operations based in part on the numbers of pages in each memory usage class for the virtual machine. Calls to the guest operating system provide the memory usage class information. Memory reclamation not only can improve the performance of existing VMs, but can also permit the addition of a VM on the host machine without substantially impacting the performance of the existing and new VMs.

20 Claims, 8 Drawing Sheets

(56) References Cited

U.S. PATENT DOCUMENTS

| | | | | |
|---|---|---|---|---|
| 2005/0235125 | A1* | 10/2005 | Accapadi | G06F 12/023 711/170 |
| 2006/0129780 | A1* | 6/2006 | Dunshea | G06F 12/1009 711/170 |
| 2008/0104152 | A1* | 5/2008 | Stephens | G06F 12/0253 |
| 2008/0126547 | A1* | 5/2008 | Waldspurger | G06F 9/4881 709/226 |
| 2008/0301256 | A1* | 12/2008 | McWilliams | G06F 12/0284 709/214 |
| 2009/0144510 | A1* | 6/2009 | Wibling | G06F 9/5016 711/147 |
| 2009/0150640 | A1* | 6/2009 | Royer | G06F 9/5077 711/173 |
| 2010/0017576 | A1* | 1/2010 | Bomma | G06F 9/45537 711/163 |
| 2010/0115188 | A1* | 5/2010 | Lee | G06F 12/0246 711/103 |
| 2010/0299667 | A1 | 11/2010 | Ahmad et al. | |
| 2010/0332658 | A1 | 12/2010 | Elyashev | |
| 2011/0320682 | A1* | 12/2011 | McDougall | G06F 12/023 711/6 |
| 2012/0117299 | A1 | 5/2012 | Waldspurger et al. | |
| 2013/0185480 | A1* | 7/2013 | Newell | G06F 12/023 711/103 |
| 2014/0173169 | A1* | 6/2014 | Liu | G06F 12/1009 711/6 |
| 2014/0189267 | A1* | 7/2014 | Qi | G06F 17/30088 711/158 |
| 2015/0161056 | A1* | 6/2015 | Deguillard | G06F 12/1009 711/6 |

OTHER PUBLICATIONS

Office Action dated Jan. 21, 2016 in related U.S. Appl. No. 14/101,796.

* cited by examiner

TRACKING GUEST MEMORY CHARACTERISTICS FOR MEMORY SCHEDULING

CROSS-REFERENCE TO RELATED APPLICATION(S)

This application is related to co-pending U.S. patent application Ser. No. 14/101,796, filed on the same day as this application, and also entitled "Tracking Guest Memory Characteristics for Memory Scheduling", the entire contents of which are incorporated by reference herein.

BACKGROUND

A host computer system for virtual machines, such as the ESX® server available from VMware Inc. of Palo Alto, Calif., is able to support concurrent execution of multiple virtual machines (VMs). A guest operating system (OS) and applications run in the VM's memory and make demands on the physical memory of the ESX® server. Often, a VM may be configured with a large amount of virtual memory to handle unexpected increases in load. This, however, creates an increased demand on the underlying physical memory and limits the available physical memory for supporting other VMs hosted by the same server. If the resulting memory shortage is not managed well, the performance of the other VMs may degrade, even though increases in load do not materialize for the VM with the large memory allocation and the extra memory that has been allocated thereto is unused.

SUMMARY

One or more embodiments provide a technique for tracking guest memory characteristics and reclaiming memory from virtual machines in accordance with such characteristics.

One embodiment is a method for reclaiming memory pages from a VM that is running in a computer system. This method includes the steps of categorizing memory pages of the VM into multiple memory usage classes, estimating the total number of memory pages in each of the multiple memory usage classes, determining a target number of memory pages to be reclaimed based on the estimated numbers of memory pages in each of the multiple memory usage classes, and setting the target number to cause reclamation of memory pages, up to the target number, from the VM.

Another embodiment is a method for allocating memory pages to a VM that is running in a computer system. This method includes the steps of categorizing memory pages of the VM into multiple memory usage classes, estimating the total number of memory pages in each of the multiple memory usage classes, determining that the VM has insufficient memory based on the estimated numbers, and decreasing a target number of memory pages to be reclaimed based on the estimated numbers of memory pages in each of the multiple memory usage classes to cause allocation of additional memory pages to the VM.

Further embodiments of the present invention include a non-transitory computer-readable storage medium comprising instructions that cause a computer system to carry out one or more of the above methods as well as a computer system configured to carry out one or more of the above methods.

DETAILED DESCRIPTION

Figure 1:
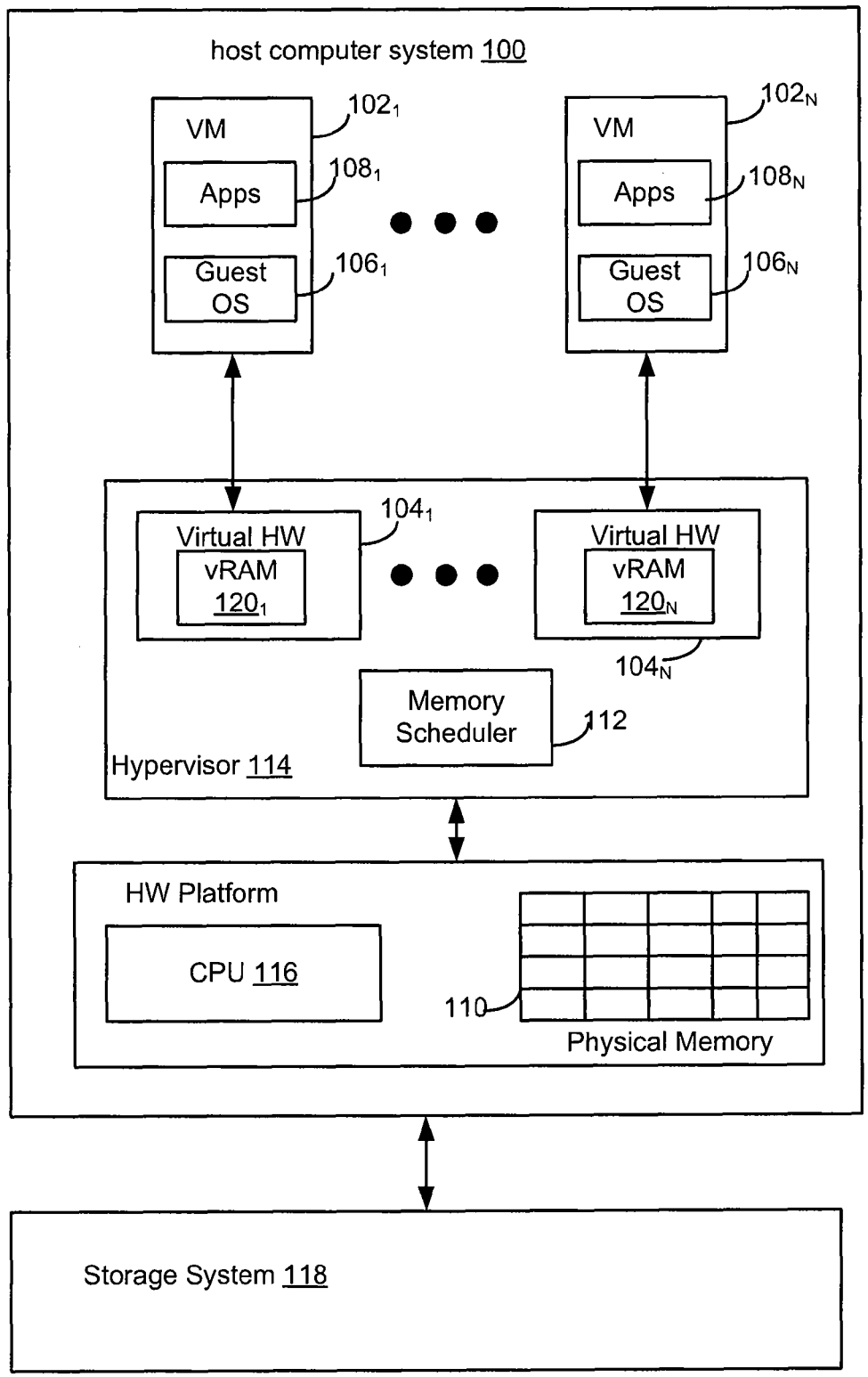
FIG. 1 depicts a host computer system with one or more virtual machines, the memory for which is managed according to embodiments.

FIG. 1 depicts a host computer system 100 that includes CPU 116 and physical memory 110, and is coupled to storage system 118. Host computer system 100 is also configured with a hypervisor 114 to support the execution of one or more virtual machines $102_1$-$102_N$ (collectively referred to as virtual machines 102) by emulating virtual hardware $104_1$-$104_N$ each of which includes virtual RAM (vRAM) $120_1$-$120_N$. Each of the virtual machines has a designated amount of virtual RAM allocated thereto so that it can carry out tasks of guest operating systems $106_1$-$106_N$ and guest applications $108_1$-$108_N$ operating in virtual machines 102. The virtual RAM allocated to each virtual machine is backed by the physical memory (pRAM) 110 in host computer system 100. While a large amount of physical memory 110 may be available on host computer system 100, it should be recognized that virtual memory in excess of the total amount of physical memory 110 may have been allocated to virtual machines 102, a condition known as memory over-commitment. As a result, during operation, available physical memory may become scarce, and the competing demands on the available physical memory by virtual machines 102 need to managed in such a manner that each virtual machine 102 is given the physical memory it needs. Otherwise, performance of one or more of virtual machines 102 may degrade. This management task is assigned to a memory scheduler 112, which is a part of hypervisor 114. The tasks of memory scheduler 112 include allocation of physical memory to each of virtual machines 102 as its memory needs increase, and reclamation of physical memory from each of virtual machines 102 as its memory needs decrease or as memory needs of other virtual machines 102 increase.

According to embodiments, memory scheduler 112 makes decisions about allocation and reclamation based on host memory state information, in particular the amount of physical memory that is currently available and thus allocatable, and characteristics of memory usage by virtual machines 102, in particular the static memory state (sMs) of virtual machines, the dynamic memory state (dMs) of virtual machines, and the guest memory state (gMs) of the virtual machines.

The host memory state, referred to herein as hMs, is defined with respect to one of four levels: high, soft, hard, and low. The high level is set as a percentage of the total amount of physical memory, and the other levels are defined with respect to the high level. In one embodiment, the soft, hard, and low levels are 66%, 33%, and 16.6%, respectively, of the high level. For example, if the high level is set as 6% of the total physical memory, then the soft, hard, and low levels are 4%, 2%, and 1%, respectively, of the total physical memory. Other percentage levels are possible and can be set by the user.

The static memory state for a virtual machine includes: (1) a user-configured virtual address space of the virtual machine (also represented herein as S1 pages), (2) a memory reservation that guarantees a minimum amount of memory for the virtual machine (also represented herein as S2 pages), (3) a memory limit that restricts the maximum amount of memory allocated to the virtual machine (also represented herein as S3 pages), and (4) a parameter for memory shares that indicates the priority for allocating memory to the virtual machine relative to other virtual machines that are sharing memory therewith (hereinafter referred to as S4). The memory reservation, the memory limit, and the memory shares parameter are referred to herein as memory entitlement parameters and are set by the virtual machine administrator.

The dynamic memory state for a virtual machine includes: (1) the number of virtual pages currently being consumed (also represented herein as D1 pages), (2) the number of virtual pages currently being ballooned (also represented herein as D2 pages), (3) the number of virtual pages currently being swapped (also represented herein as D3 pages), and (4) the estimated working set size for the virtual machine (also represented herein as D4 pages).

Figure 2:
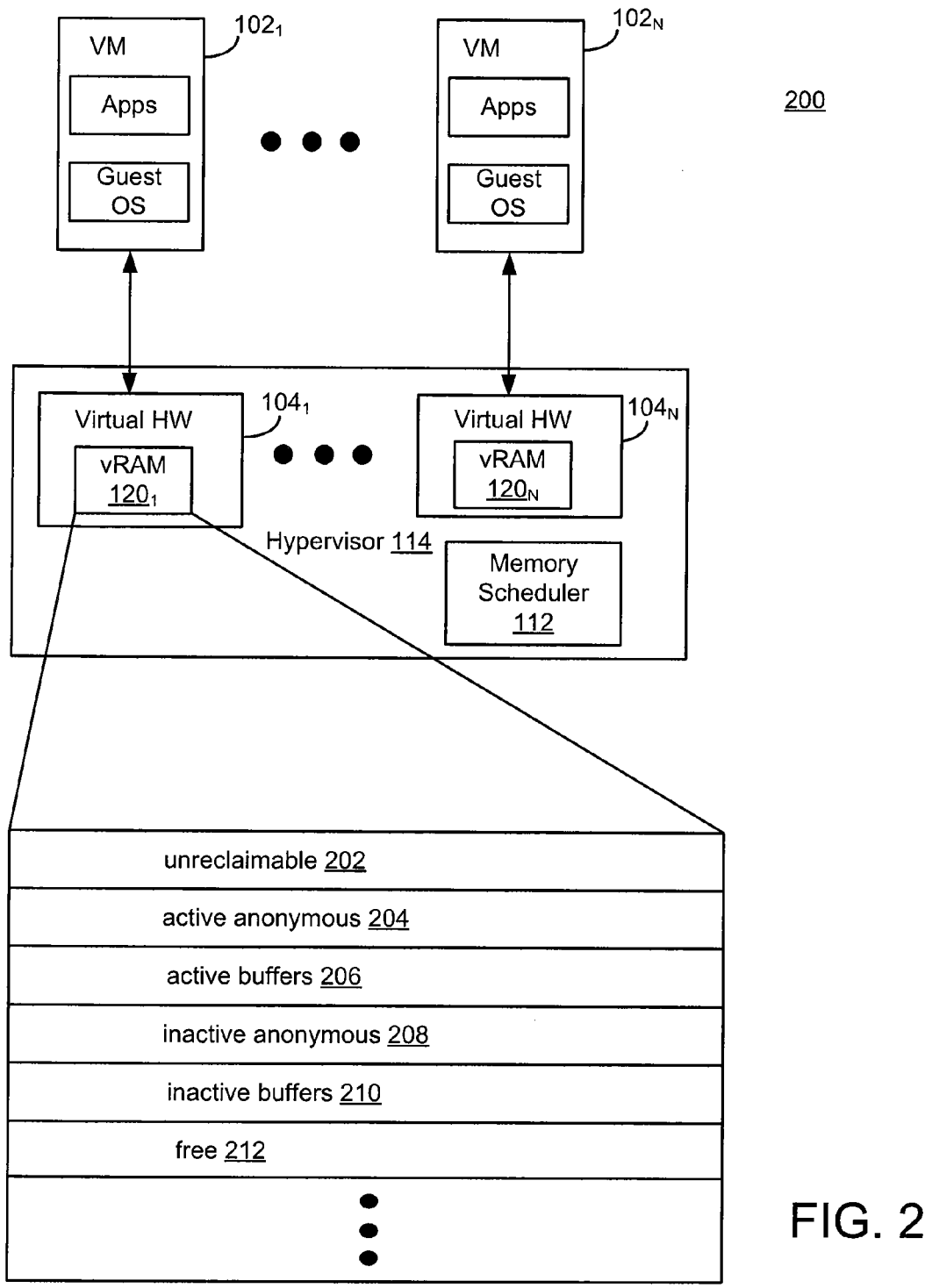
FIG. 2 depicts an example state of virtual memory for one of the VMs.

The guest memory state for a virtual machine describes in a detailed manner the total number of memory pages of the virtual machine memory that are in each of a number of different categories (hereinafter also referred to as "memory usage classes"), where the categories include unreclaimable (where G1 represents the total number of pages in this category), active anonymous (where G2 represents the total number of pages in this category), active buffer (where G3 represents the total number of pages in this category), inactive anonymous (where G4 represents the total number of pages in this category), inactive buffer (where G5 represents the total number of pages in this category), and free (where G6 represents the total number of pages in this category). Unreclaimable pages are memory pages that have been pinned by the guest OS or guest applications of the virtual machine and are not reclaimable by the guest OS. Free pages are memory pages that are available to the guest operating system for immediate allocation. Active and inactive buffer pages are memory pages in the buffer cache used for secondary storage, the active buffer pages representing dirty (modified) memory pages or frequently accessed clean memory pages in the buffer cache and the inactive buffer pages representing infrequently accessed clean memory pages in the buffer cache. Anonymous pages are memory pages that have been allocated by library functions. Such pages are active if frequently used and inactive otherwise. FIG. 2 depicts an example state of virtual memory $120_1$ for virtual machine $102_1$. As shown, virtual memory $120_1$ includes unreclaimable memory pages 202, active anonymous pages 204, active buffer pages 206, inactive anonymous pages 208, inactive buffer pages 210, and free pages 212. These six categories of virtual memory $120_1$ are given by way of example and, in alternative embodiments, virtual memory $120_1$ may be classified into different categories and into less than or more than six categories.

Figure 3:
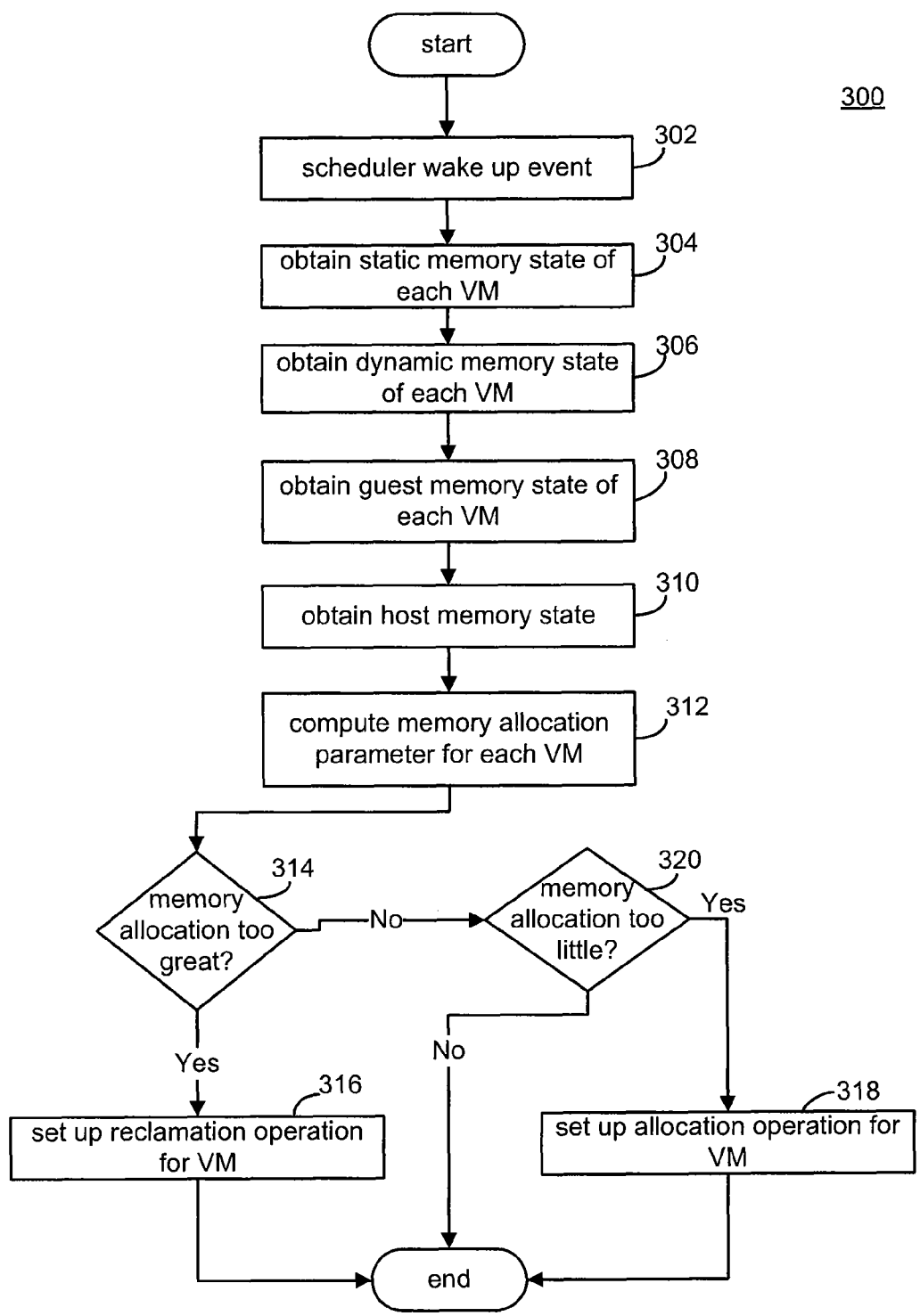
FIG. 3 depicts a top-level flow of a memory scheduler according to embodiments.

FIG. 3 depicts a top level flow 300 of memory scheduler 112 in FIG. 1. Memory scheduler 112 is periodically activated (e.g., every 15 seconds) in step 302 and, upon activation, obtains the static memory state of each virtual machine (VM) in step 304, the dynamic memory state of each VM in step 306, the guest memory state of each VM in step 308, and the host memory state in step 310. Based on the information obtained in steps 304, 306, 308, and 310, memory scheduler 112 computes a memory allocation parameter for each powered-on virtual machine in step 312, and tests the memory allocation parameter to determine if the memory allocation is too large in step 314. If not, memory scheduler 112 tests the memory allocation parameter to determine if the memory allocation is too small in step 320. If the memory allocation is too large, memory scheduler 112 sets up a reclamation operation for the VM in step 316. The reclamation operation is described below in conjunction with FIG. 4. If the memory allocation is too small, memory scheduler 112 sets up an allocation operation for the VM in step 318. The allocation operation is described below in conjunction with FIG. 5.

In the embodiments described herein, memory scheduler 112 supports four different reclamation processes, ballooning, swapping, page sharing, and compression.

Ballooning is the most efficient reclamation process as it can reclaim memory pages without any noticeable effect on the workload of a VM. It operates by using a per-VM guest operating system kernel balloon driver. When the hypervisor wants to reclaim memory pages from a VM, it increases a balloon target of that VM which causes the balloon driver for that VM to allocate pages from the guest operating system kernel, pin them, and release them to the hypervisor. The hypervisor then repurposes the host physical memory backing the pages released by the VM, e.g., for reallocation to other VMs. It should be recognized that various enhancements to the ballooning technique may be applied. For example, ballooning may be performed as a batch process in which multiple pages (e.g., 32 pages) are ballooned in a single operation instead of one page at a time. The ballooning technique is described in further detail in U.S. Pat. No. 8,145,763, the entire contents of which are incorporated by reference herein.

Swapping is another reclamation process. In this process, the contents of a guest page currently stored in host physical memory are stored in persistent storage via an I/O operation, after which the host physical memory may be freed and repurposed. The persistent storage can be either solid-state storage or rotating magnetic disks in storage system 118 shown in FIG. 1. It should be recognized that various enhancements to the swapping technique may be applied. For example, swapping may be performed as a batch process in which multiple pages (e.g., 32 pages) are swapped in a single I/O operation.

Page sharing is yet another reclamation process. In page sharing, guest pages that contain identical content are found within the same VM or across different VMs. The guest pages that contain identical content are mapped to the same page in the host physical memory. Various page sharing techniques may be used including the one described in U.S. Pat. No. 6,789,156, the entire contents of which are incorporated by reference herein.

Compression is another reclamation process. In this process, a guest memory page is compressed, which permits more memory pages to be stored in a standard sized memory page. It should be recognized that the compression algorithm may be altered, enhanced, or replaced with another compression algorithm. In addition, one or more memory pages may be compressed together.

Page sharing and compression reclamation processes are opportunistic processes and are carried out as background processes. As between ballooning and swapping, memory scheduler 112 selects the more appropriate reclamation process for each VM, but before the selection is made, a memory allocation parameter P for a VM is computed. This parameter is used to determine whether a VM has been allocated too much or too little memory. In one embodiment, the memory allocation parameter is computed according to Eqn. 1, where the target memory size is a function of sMs (described above) and a modified working set size, D4_mod, which is computed according to Eqn. 2. Various techniques for computing the target memory size of a VM may be employed in other embodiments including the ones disclosed in U.S. Pat. No. 7,412,492 and U.S. Pat. No. 8,171,140, the entire contents of which are incorporated by reference herein.

$$P = \text{target memory size} - D1 \qquad (\text{Eqn. 1})$$

$$D4\_mod = \max[D4, G1 + wsc], \qquad (\text{Eqn. 2})$$

where:
  $wsc = (wsa + wsb)/2$;
  $wsa = (S1 - G1) * D4 / S1$; and
  $wsb = G2 + G3$.

The working set size, D4, may be determined by any known technique, including the one disclosed Ser. No. 12/942,765, entitled "Efficient Online Construction of Miss Rate Curves" and filed Nov. 9, 2010, the entire contents of which are incorporated by reference herein. In Eqn. 2, this working set size is modified by the value wsc, which is an average of wsa and wsb. The value wsa for a VM is the number of reclaimable pages (S1−G1) based on the fraction of memory occupied by the computed working set, D4/S1. The value wsb for a VM is the value of the active number of anonymous pages G2 and active buffer pages G3 in the VM's memory. The modified value of the working set size gives a more accurate allocation of memory to a VM than the original computed working set size. The modification is, however, optional, and so in an alternative embodiment, the modified value of the working set for a particular VM can be disabled, thereby causing the modified working set value to return to the original working set value.

Once the memory allocation parameter is known, it can be examined to determine if a VM has too much memory (i.e., P<0). If so, the scheduler 112 executes a reclamation operation to reclaim some of the VM's memory. In general, as long as there is a sufficient number of free pages in the host physical memory, memory scheduler 112 selects ballooning instead of swapping as the reclamation method. More specifically, memory scheduler 112 sets up a reclamation process as follows:

If the host memory state is high or soft, memory scheduler 112 sets up ballooning as the reclamation method and sets a ballooning target value, bTgt=D2+min[−P, (G5+G6)] as the number of pages to be reclaimed. It should be noted that the balloon target helps the ballooning operation avoid reclaiming active guest memory pages, as the balloon target is based in part on inactive buffer pages and free pages.

If the host memory state is hard or low, memory scheduler 112 sets up swapping as the reclamation method and sets a swapping target value, sTgt=−P, as the number of pages to be reclaimed. Alternatively, if memory is low, ballooning is used first to reclaim some of the ballooning target and swapping is used subsequently to reclaim the remainder of the target.

If sharing or compression is involved, the balloon target is computed according to Eqn. 3 below.

$$bTgt = D2 + \min[Q, (G4 + G5 + G6)] \qquad (\text{Eqn. 3})$$

where:
  $Q = \max[(-P - \min[-P, (G5+G6)]) - psharezip), 0]$, and
  psharezip = number of shareable or compressible pages.

Thus, in the case where sharing or compression is involved, the balloon target may be affected by the number of shareable or compressible pages.

Figure 4:
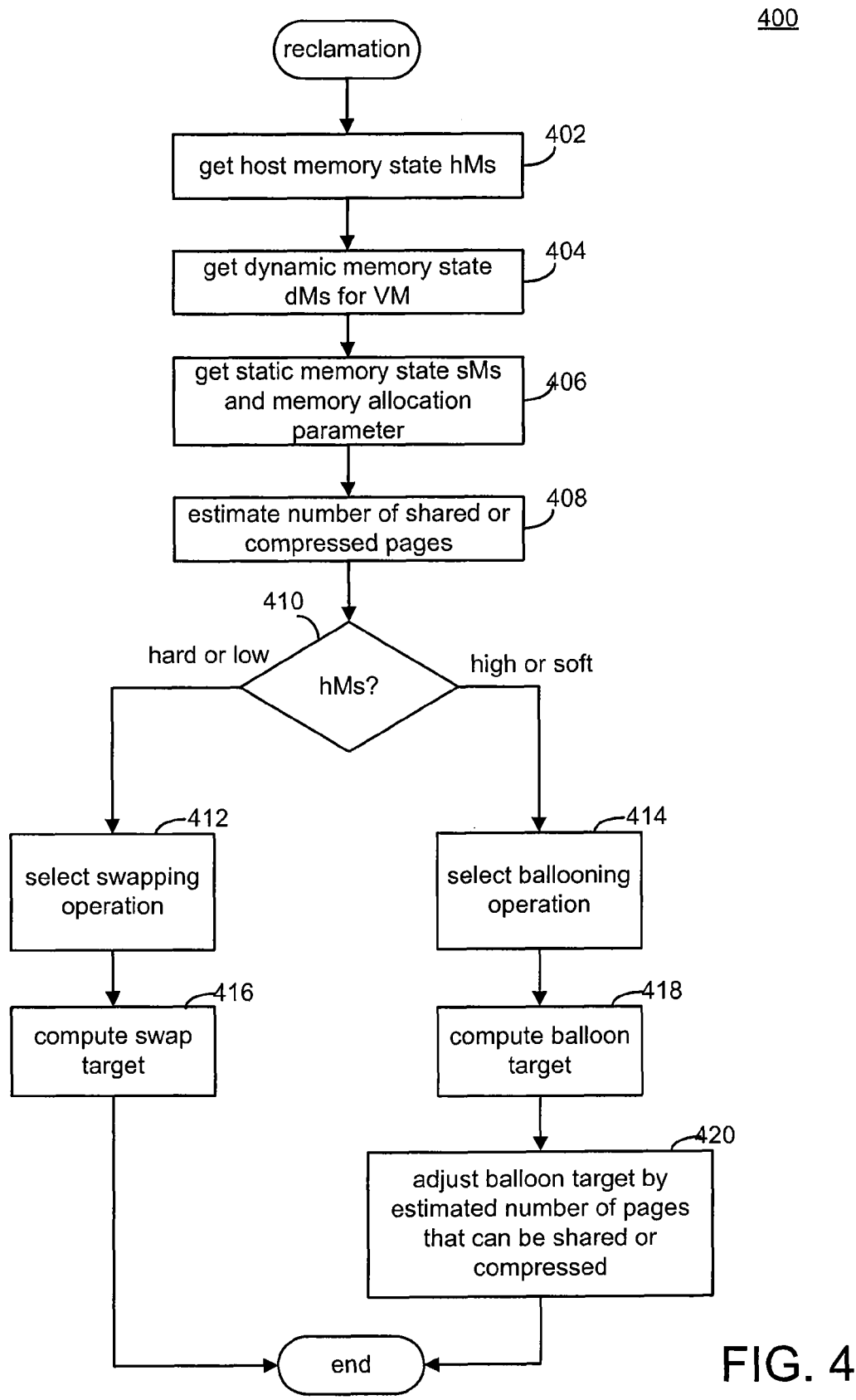
FIG. 4 depicts an example memory reclamation process according to embodiments.

FIG. 4 depicts an example memory reclamation process 400 by which memory scheduler 112 reduces the memory allocated to a VM so that physical memory can be freed for possible reallocation to another virtual machine. Memory scheduler 112 obtains the host memory state in step 402, the dynamic memory state of the VM in step 404, and the static memory state of the VM and the memory allocation parameter for the VM in step 406. In step 408, memory scheduler 112 estimates the number of pages that can be shared or compressed. After all of the preliminary data are obtained, memory scheduler 112 in step 410 decides based on the host memory state whether to execute a swapping operation to reclaim memory or a ballooning operation to reclaim memory. If the host memory state is hard or low, the swapping operation is selected in step 412 and the swap target is computed in the manner described above in step 416. If the host memory state is high or soft, the ballooning operation is selected in step 414 and the balloon target is computed in the manner described above in step 418. In step 420, the balloon target is adjusted by the estimated number of pages that can be shared or compressed. The process ends after step 416 and step 420.

In one embodiment, the number of shareable or compressible pages for each virtual machine is estimated by selecting a random subset P of memory pages of an active VM with a memory size of S1 and computing the estimated number of shareable pages, s, and the estimated number of compressible pages, c, according to the following formula:

$$s = (ps/\{P\}) * S1 \text{ and } c = (pc/\{P\}) * S1,$$

where:
  ps is the number of pages in the subset that are determined according to techniques known in the art to be shareable;
  pc is the number of pages in the subset that are determined according to techniques known in the art to be compressible, and
  {P} is the size of the random subset.

Because swapping has a higher performance cost than ballooning, memory scheduler 112 throttles memory allocations to virtual machines when it detects that memory allocations are occurring at a faster rate than the aggregate ballooning rate from a reclaiming VM. The throttling is realized by inserting a small delay (e.g., 1 millisecond) after every request for memory by the virtual machine. The inserted delay is made to be proportional to the current ballooning rate from all reclaiming VMs.

As described in conjunction with FIG. 3 above, when the memory allocation parameter, P, indicates that the VM has too little memory (i.e., P>0), memory scheduler 112 allocates more memory to the VM by reducing the swap and balloon targets that are in place for the VM. The swap target is reduced first because swapping has a higher performance cost than ballooning. The swap target, sTgt, is reduced according to the formula: sTgt=D3−min(D3, P). After the swap target has been reduced, the memory allocation parameter P is reduced by the same amount, P=P−min(D3, P).

Then, the balloon target, bTgt, is reduced according to the formula, bTgt=D2−min(D2, P). After the balloon target has been reduced, the memory allocation parameter P is reduced by the same amount, P=P−min(D2, P). It should be recognized that the actual memory allocation will occur subsequent to these reductions in accordance with the reduction in the swap and balloon targets. It should also be recognized that the next time the memory allocation parameter is checked in step 320 and VM still has too little memory, the reduction in the swap and balloon targets will be executed again.

Figure 5:
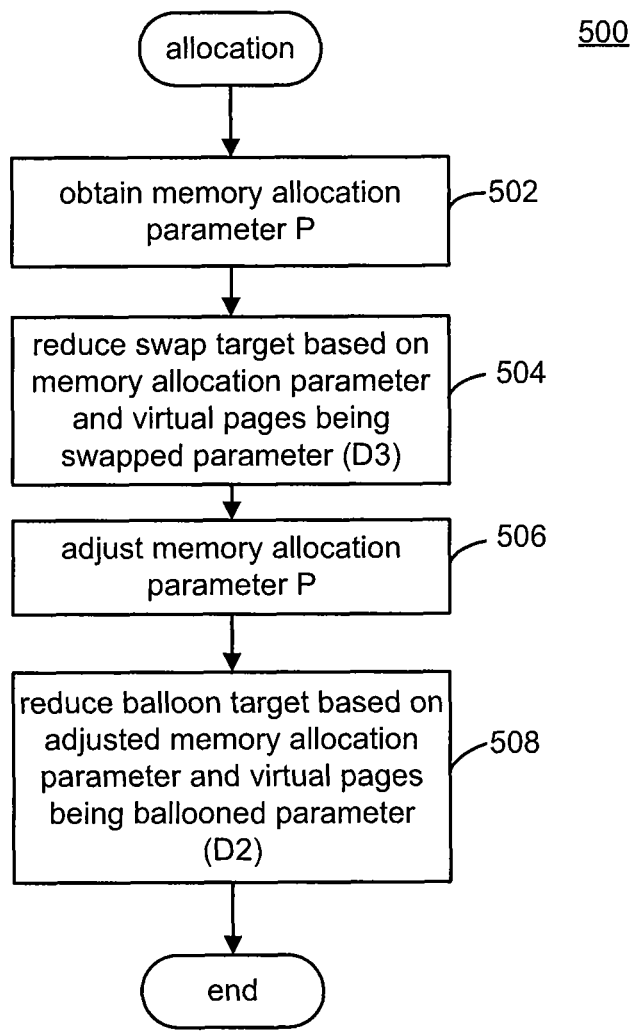
FIG. 5 depicts an example memory allocation process according to embodiments.

FIG. 5 depicts an example memory allocation process 500 (depicted as step 318 of FIG. 3). In step 502, memory scheduler 112 obtains the memory allocation parameter P computed in step 312 of FIG. 3. Memory scheduler 112, in step 504, uses the memory allocation parameter P to reduce the swap target as described above, and adjusts the memory allocation parameter P in step 506. Then, memory scheduler 112 in step 508 uses the memory allocation parameter P to reduce the balloon target as described above and adjusts the memory allocation parameter P in step 510.

In the techniques described above, memory scheduler 112 relies on the guest memory state gMs to make decisions on when to reclaim memory, when to allocate memory, what techniques to employ, and what targets to use. In one embodiment, the guest memory state gMs is determined through operating system calls or APIs. These operating system calls or APIs provide a way to collect sufficient information about guest memory pages so that that guest memory pages can be characterized as unreclaimable memory pages, active anonymous pages, active buffer pages, inactive anonymous pages, inactive buffer pages, and free pages. Examples of operating system calls include /proc/meminfo and /proc/kpageflags calls for Linux® operating systems, and similar calls for Windows® 7 operating systems, such as NtQuerySystemInformation.

Figure 6:
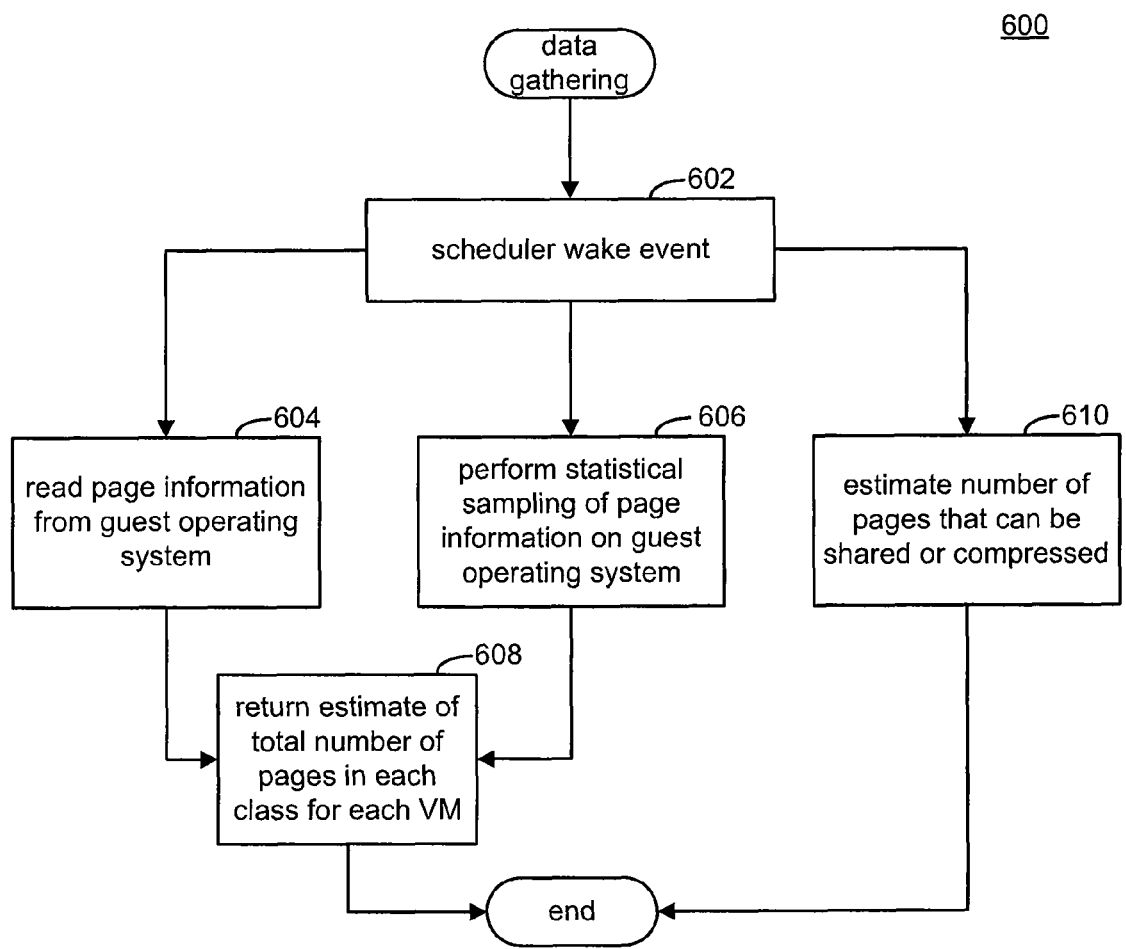
FIG. 6 depicts an example data gathering process according to embodiments.

In another embodiment, the guest memory state gMs is determined by statistical sampling of guest memory pages. FIG. 6 depicts an example process 600 for estimating the number of pages in each of the memory usage classes and also for estimating the number of shareable and compressible pages. In step 602, memory scheduler 112 responds to a periodic wake-up event (e.g., once every 15 seconds). Memory scheduler 112 then decides, depending on the guest operating system in each virtual machine and the size of memory in the virtual machine, whether to determine guest memory state of guest memory pages of each VM by using system calls or APIs as in step 604 or to perform statistical sampling of page information on the guest operating system in each VM as in step 606. In either case, an estimate of the total number of pages in each memory usage class for each VM is returned. Memory scheduler 112 also estimates the number pages that can be shared or compressed (applying known techniques), and returns those results as well.

Figure 7:
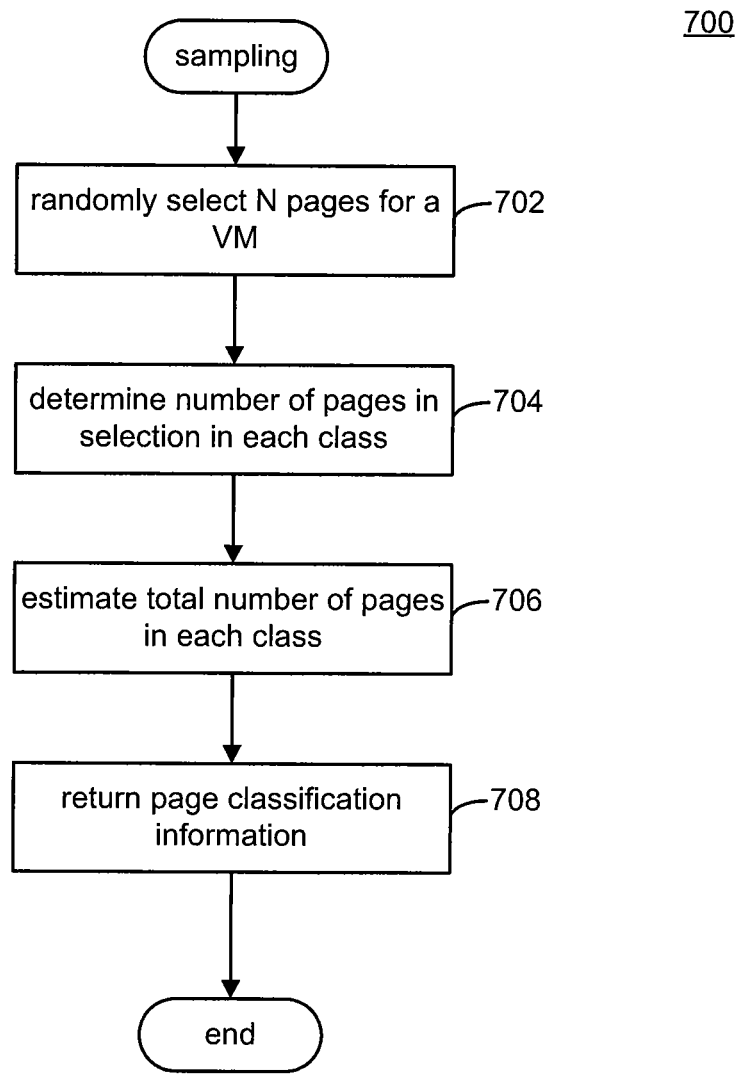
FIG. 7 depicts an example sampling process according to embodiments.

FIG. 7 depicts an example sampling process 700. In step 702, memory scheduler 112 randomly selects a number N of pages for a VM. In step 704, memory scheduler 112 obtains, by means of guest operating system calls with each page as a parameter, memory state information of the page. The scheduler then uses this memory state information to determine the memory usage class to which the page belongs. In step 706, memory scheduler 112 estimates the total number of pages in each of the memory usage classes and in step 708, returns the memory usage class data. In one embodiment, the number N of pages that is randomly selected is 1000. Selections other than random selections are also possible.

A better understanding of guest memory characteristics can help decide whether sufficient memory pages can be reclaimed from VMs currently executing on a host computer system without impacting their performance, to support execution of additional VMs on the host computer. In one embodiment, if sufficient memory pages are available in the host computer system, one or more new VMs are launched in the host computer system until sufficient memory pages are no longer available. When sufficient memory pages are no longer available in the host computer system, new VMs are launched in a different host computer system.

Figure 8:
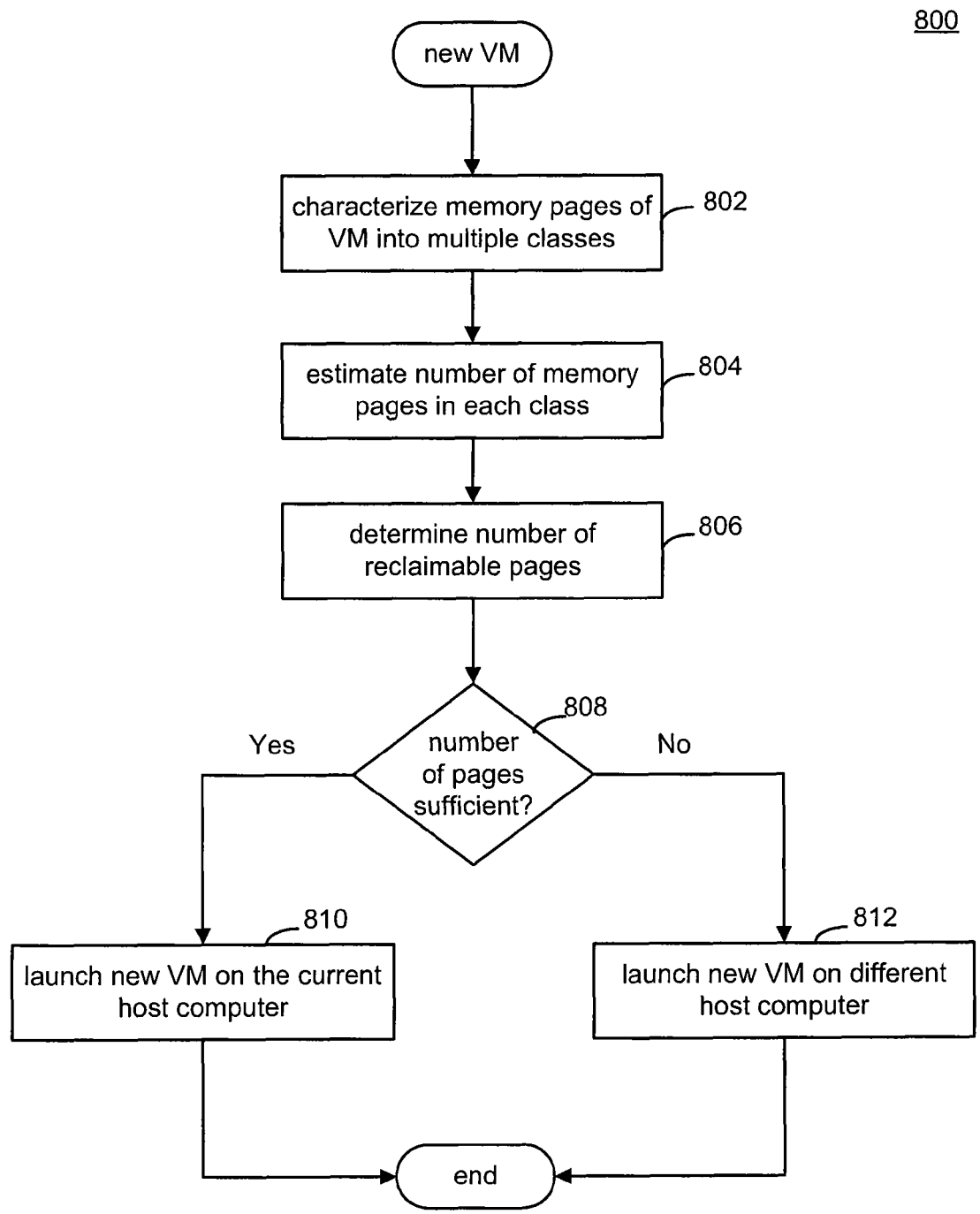
FIG. 8 depicts an example process for placing a new virtual machine.

FIG. 8 depicts an example process for placing a new virtual machine. In step 802, memory pages of the VM are characterized into multiple memory usage classes. In step 804, the number of pages in each memory usage class is estimated and in step 806, the number of pages that can be reclaimed without substantially impacting the performance of the VMs currently running on the host computer system is determined. In one embodiment, this number for each running VM equals: S1, the number of memory pages currently allocated to the VM, minus G1, the number of memory pages allocated to the VM that is classified as unreclaimable according to the techniques described above. Accordingly, the total number of pages that can be reclaimed without substantially impacting the performance of the VMs currently running on the host computer system is the aggregate total of the quantity (S1−G1) across all VMs currently running on the host computer system. If the number of pages is sufficient, as determined in step 808, then a new VM is launched on the same host computer system in step 810. Otherwise, a new VM is launched in step 812 on a different host computer system.

Various embodiments described herein may be practiced with other computer system configurations including handheld devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for reclaiming memory pages from a virtual machine (VM) that is running in a computer system, comprising:
    categorizing memory pages of the VM into multiple memory usage classes according to usage of the memory pages over a time interval;
    estimating the total number of memory pages in each of the multiple memory usage classes;
    determining a target number of memory pages to be reclaimed from the VM based on the estimated numbers of memory pages in each of the multiple memory usage classes; and
    setting the target number to cause reclamation of memory pages, up to the target number, from the VM.

2. The method of claim 1, wherein estimating the number of pages in each of the multiple memory usage classes includes:
    selecting a number of memory pages in the memory of the VM;
    determining the number of selected pages that belong to each memory usage class of the multiple memory usage classes; and
    estimating the total number of pages in each memory usage class from the determined number of selected pages that belong to each memory usage class of the multiple memory usage classes.

3. The method of claim 1, wherein the multiple memory usage classes include memory usage classes of unreclaimable, active anonymous, active buffer, inactive anonymous, inactive buffer, and free.

4. The method of claim 1, further comprising: selecting a memory reclamation technique, wherein the target number of memory pages to be reclaimed is different for different selections for the memory reclamation technique.

5. The method of claim 4, further comprising: determining a state of physical memory in the computer system, wherein a ballooning technique is selected as the memory reclamation technique if the available physical memory is greater than a threshold.

6. The method of claim 5, further comprising: reducing the target number of memory pages to be reclaimed by an estimated number of memory pages that can be shared or compressed.

7. The method of claim 4, wherein a swap technique is selected as the memory reclamation technique if the available physical memory is less than a threshold.

8. A method for reclaiming memory pages from a virtual machine (VM) in a computer system having a VM running therein, comprising:
    categorizing memory pages of the VM into multiple memory usage classes according to usage of the memory pages over a time interval;
    estimating the total number of memory pages in each of the multiple memory usage classes;
    selecting a memory reclamation technique based on the estimated numbers; and
    setting a target number of memory pages to be reclaimed to cause reclamation of memory pages, up to the target number, from the VM.

9. The method of claim 8, wherein the selected memory reclamation technique has a lowest performance cost amongst a set of possible selections.

10. The method of claim 8, wherein the selected memory reclamation technique is a ballooning technique.

11. The method of claim 9, further comprising:
    prior to said setting, reducing the target number of memory pages to be reclaimed by an estimated number of memory pages that can be shared or compressed.

12. The method of claim 8, wherein the selected memory reclamation technique is a swap technique.

13. A non-transitory computer readable medium comprising instructions that cause a host computer system to perform a method of reclaiming memory pages from a virtual machine (VM) running therein, said method comprising the steps of:
    categorizing memory pages of the VM into multiple memory usage classes according to usage of the memory pages over a time interval;
    estimating the total number of memory pages in each of the multiple memory usage classes;
    determining a target number of memory pages to be reclaimed from the VM based on the estimated numbers of memory pages in each of the multiple memory usage classes; and
    setting the target number to cause reclamation of memory pages, up to the target number, from the VM.

14. The non-transitory computer readable medium of claim 13,
    wherein estimating the number of pages in each of the multiple memory usage classes includes:
    selecting a number of memory pages in the memory of the VM;
    determining the number of selected pages that belong to each memory usage class of the multiple memory usage classes; and
    estimating the total number of pages in each memory usage class from the determined number of selected pages that belong to each memory usage class of the multiple memory usage classes.

15. The non-transitory computer readable medium of claim 13, wherein the multiple memory usage classes include memory usage classes of unreclaimable, active anonymous, active buffer, inactive anonymous, inactive buffer, and free.

16. The non-transitory computer readable medium of claim 13, wherein the method further comprises: selecting a memory reclamation technique, wherein the target number of memory pages to be reclaimed is different for different selections for the memory reclamation technique.

17. The non-transitory computer readable medium of claim 16, wherein the method further comprises: determining a state of physical memory in the computer system, wherein a ballooning technique is selected as the memory reclamation technique if the available physical memory is greater than a threshold.

18. The non-transitory computer readable medium of claim 17, wherein the method further comprises: reducing the target number of memory pages to be reclaimed by an estimated number of memory pages that can be shared or compressed.

19. The non-transitory computer readable medium of claim 16, wherein a swap technique is selected as the memory reclamation technique if the available physical memory is less than a threshold.

20. The non-transitory computer readable medium of claim 16, wherein the selected memory reclamation technique has a lowest performance cost amongst a set of possible selections.

* * * * *